Aug. 23, 1966  J. SIKORA  3,267,809
APPARATUS FOR LAUNCHING SATELLITE-CARRYING ROCKETS
Filed April 18, 1963
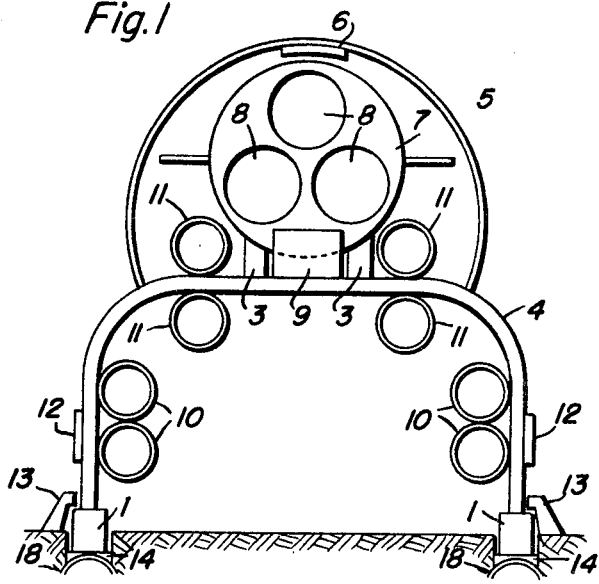
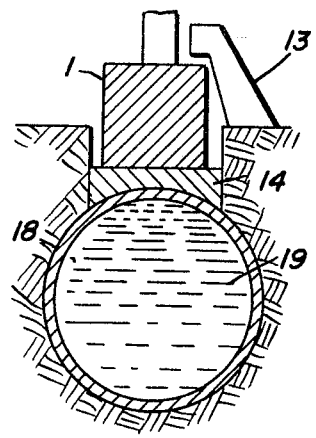
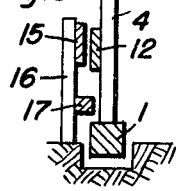
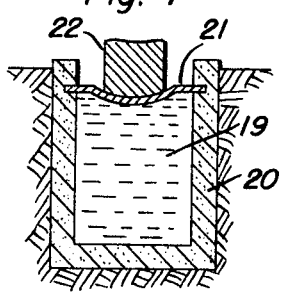
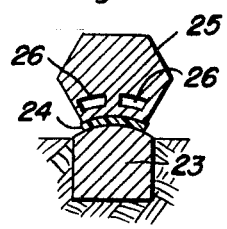
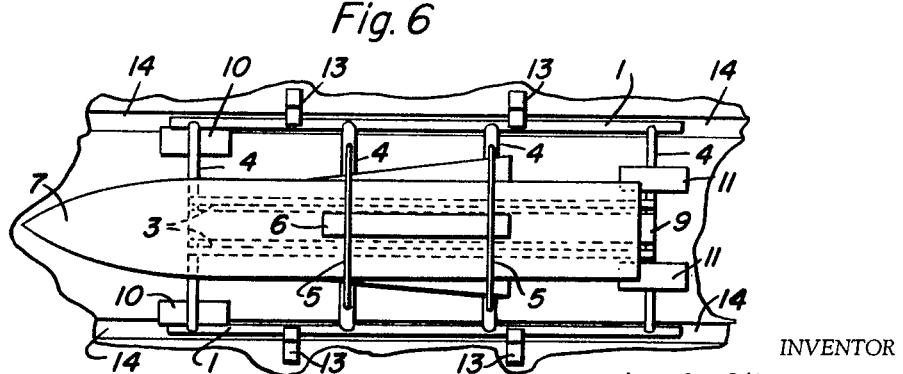
INVENTOR
Jozef Sikora
BY Mawhinney & Mawhinney
ATTORNEY United States Patent Office 3,267,809
Patented August 23, 1966

3,267,809
APPARATUS FOR LAUNCHING SATELLITE-CARRYING ROCKETS
Jozef Sikora, Beloeil, Quebec, Canada (455 Rang des Trente, St. Hilaire, Rouville County, Quebec, Canada)
Filed Apr. 18, 1963, Ser. No. 273,993
Claims priority, application Great Britain, Apr. 25, 1962, 15,663/62
1 Claim. (Cl. 89—1.819)

The invention relates to launching rockets carrying satellites into orbits around the earth.

Conventionally, rockets carrying earth satellites into orbits (or space rockets) are launched vertically from a position of rest. Alternatively, space rockets could be launched in an approximately horizontal direction, after being accelerated on a runway to a velocity at which the space rocket, at the angle of launching, is capable of sustained flight, and then caused to ascend. If the acceleration before launching the rocket horizontally was imparted to the rocket by other means than the engines of the space rocket, the rocket could have a higher payload than one of similar weight launched from a fixed site, because, at the time of launching, the rocket would already have momentum. In general, the higher the velocity at which the rocket is launched horizontally, the higher is its payload.

Acceleration of space rockets before launching could be achieved by placing the rocket to be launched on a platform supported on wheels and then accelerating the loaded platform by other means than the engines of the space rocket. Such devices have been proposed in British Patents 482,057 and 490,408 for assisting the launching of aircraft. However, velocities at which aircraft are conventionally launched are too low to be useful in launching space rockets. The hazards involved in the use of wheels for support of fast vehicles carrying heavy loads rapidly increase with the velocity of the vehicle and make these methods unattractive for launching space rockets.

Space satellites are useful as aids in communication, navigation and surveying. Difficulties in placing heavy objects into orbits around the earth seriously limit the useful applications of space satellites.

The invention has an object of providing improved means of launching space satellites. A particular object of the invention is to provide means of increasing the payload of space rockets. Other objects will appear hereinafter.

The invention provides an apparatus comprising a slippery track adapted for guiding and supporting sledges and a sledge adapted for travelling along the track and for carrying a space rocket and having means for accelerating along the track while carrying the rocket and means for launching the carried rocket to fly and ascend.

According to the invention a sledge carrying the rocket to be launched is accelerated on the slippery track by its engines to a velocity at which the rocket, when launched from the sledge, can fly and ascend through the atmosphere, the rocket is launched from the sledge and caused to ascend while the sledge is decelerated and brought to a stop.

The invention will be better understood with reference to the accompanying drawings in which G—G denotes the ground level on the sites on which tracks of the invention are constructed.

In the drawings:

FIGURE 1 is a view from the back of a sledge loaded with a space rocket and resting on the launching track.

FIGURE 2 is a cross-sectional view illustrating the construction of the launching track shown in FIGURES 1 and 6.

FIGURE 3 shows means for braking the sledge.

FIGURE 4 is a cross-sectional view similar to that of FIGURE 2 illustrating alternative construction of the launching track.

FIGURE 5 is a cross-sectional view similar to that of FIGURE 2 illustrating yet another alternative construction of the launching track.

FIGURE 6 is a view from above of the sledge of FIGURE 1.

Referring to the drawings, the frame of the sledge consists of runner beams 1, longitudinal beams 3 which support the space rocket 7 and arched, transverse beams 4. The surfaces of 3 on which the rocket 7 rests are slippery. Beam 6 mounted on supports 5 has a slippery bottom surface and prevents the rocket from being lifted off the sledge at high velocities. Support plate 9 prevents the rocket 7 from sliding backwards. The rocket has engines 8 and the sledge has pairs of jet engines 10 and 11.

The sledge rests on strips of ice 14 maintained frozen by refrigerant 19 circulated in pipe 18. Flow detecting plates may be provided in 18 to prevent a vertical temperature gradient in the refrigerant. Facilities for circulating and cooling the refrigerant are provided near the track at suitable intervals. Locks 13 prevent derailing of the sledge.

To launch the space rocket 7 the assembly shown in FIGURES 1 and 6 is placed at one end of the track with 7 pointing towards the track. Engines 10 and 11 are started and accelerate the sledge carrying 7 to a velocity at which 7, when launched, can climb through the atmosphere. Engines 8 are then started and engines 10 and 11 are shut. The rocket slips off from beams 3 and 6 and is guided to ascend along a wide arc. To decelerate the sledge after launching, along the track braking surfaces 15 are mounted on supports 16 which also carry locks 17 to prevent derailing of the sledge. Friction brakes 15, which may be spring loaded, engage friction brakes 12 of the sledge. Parachutes may be used to aid braking.

Ice is a particularly suitable material for the construction of the slippery track since its low melting point ensures dissipation of the heat generated by friction of the runners with the track. Ice tracks can be constructed by spraying refrigerated non-slippery tracks with water. FIGURE 4 illustrates the construction of a track which can be rendered slippery by spraying with water. The conduit for circulating refrigerant 19 comprises a concrete ditch 20 closed with steel plate 21, whose exposed surface when cooled by 19 can be coated with ice by spraying it with water. The sliding surface of runner 22 of a sledge adapted for use with track 21 is shaped to facilitate guiding the sledge by the track.

The sliding surfaces of the launching track may be constructed of other material than ice which has a low coefficient of sliding friction, particularly, of polytetrafluoroethylene. The construction of a polytetrafluoroethylene track is shown in FIGURE 5 in which 24 is a plate with an exposed polytetrafluoroethylene surface mounted on support 23. The runner of the sledge 25 adapted for use with plate 24 has channels 26 through which cooling fluid may be circulated.

From the point of view of increasing the payload of the space rocket it is advantageous to launch the rocket at the highest velocity compatible with other considerations. As sledges of the invention have no moving parts, such as wheels, on which stresses very rapidly increase with the increase in velocity of the sledge, the main factors which limit the choice of launching velocity are the length of the launching track required and the air drag. The launching velocity will preferably be supersonic and to decrease drag the apparatus will be provided with fairings and have polished surfaces.

For launching space rockets at velocities considerably in excess of the velocity of sound it may be advantageous to use an auxiliary sledge. For example, if the launching velocity is 1200 m.p.h., an unloaded sledge provided with turbo-jet engines may be used to push the sledge carrying the space rocket and fitted with ramjet engines to a velocity at which the rocket carrying sledge can accelerate unaided, the auxiliary turbo-jet sledge may then be disconnected and brought to a stop while the rocket carrying sledge is accelerated to the launching velocity by the ramjet engines.

Space rockets used with the invention will normally have small wings. The tracks of the invention will usually be constructed on a horizontal site and have a long straight section.

I claim:

An apparatus for launching satellite carrying rockets comprising a runway, a sledge adapted to slide on the runway, accelerating means on the sledge, means for supporting and means for launching a satellite carrying rocket on the sledge, at least one track on the runway for supporting the sledge, an ice coating on the track and at least one conduit including refrigerating fluid for maintaining the ice coating frozen.

References Cited by the Examiner

UNITED STATES PATENTS

| | | | |
|---|---|---|---|
| 1,706,065 | 3/1925 | Jenkins | 244—63 |
| 2,718,367 | 9/1955 | Doolittle | 244—108 X |
| 2,734,702 | 2/1956 | Northrop et al. | 89—1.7 X |
| 2,774,283 | 12/1956 | Harvey | 42—76 |
| 2,845,237 | 7/1958 | Doolittle et al. | 244—63 |
| 2,912,952 | 11/1959 | Simmons | 244—63 X |
| 2,953,065 | 9/1960 | Brown | 89—1.7 |
| 2,987,875 | 6/1961 | Fox | 60—35.6 |

BENJAMIN A. BORCHELT, *Primary Examiner.*

S. W. ENGLE, F. C. MATTERN, JR.,
*Assistant Examiners.*